(12) United States Patent
Raufaste et al.

(10) Patent No.: US 8,190,456 B2
(45) Date of Patent: May 29, 2012

(54) AGREEMENT METHOD AND SYSTEM TO CONSENT TO A PRORATED VALUE OF COUPON OF AN INTERLINE E-TICKET

(75) Inventors: Nathalie Raufaste, Antibes (FR); Konstantin Sorokin, Antibes (FR)

(73) Assignee: Amadeus, Biot (FR)

( * ) Notice: Subject to any disclaimer, the term of this patent is extended or adjusted under 35 U.S.C. 154(b) by 628 days.

(21) Appl. No.: 11/849,438

(22) Filed: Sep. 4, 2007

(65) Prior Publication Data
US 2009/0063220 A1   Mar. 5, 2009

(51) Int. Cl.
G06Q 10/00 (2006.01)
G06Q 50/00 (2006.01)

(52) U.S. Cl. .................................. 705/5; 705/1.1; 705/6

(58) Field of Classification Search .................. 705/1, 5, 705/6, 400, 7, 14, 1.1, 7.11
See application file for complete search history.

(56) References Cited

U.S. PATENT DOCUMENTS

| | | | |
|---|---|---|---|
| 2005/0080723 A1* | 4/2005 | Burchetta et al. | 705/39 |
| 2006/0161446 A1* | 7/2006 | Fyfe et al. | 705/1 |
| 2007/0100962 A1* | 5/2007 | Barth et al. | 709/217 |
| 2007/0185745 A1* | 8/2007 | Schukraft | 705/5 |

OTHER PUBLICATIONS

ARC communications: ARC Expands Teradata Warehouse and Launches New Solution for Interline Billing M2 Presswire, Jul. 29, 2003, p. 1.*

* cited by examiner

*Primary Examiner* — Fadey Jabr
*Assistant Examiner* — Michael Harrington
(74) *Attorney, Agent, or Firm* — Harrington & Smith

(57) ABSTRACT

An enhanced agreement method and system to consent to a prorated value of a coupon of an E-ticket corresponding to a multi-segment transport involving at least two carriers for the transportation.

The invention is based on a new system architecture, which comprises on each carrier side synchronous connections between various modules amongst which an E-ticket Server, a proration module arranged for calculating coupon prorated value, the system enabling to exchange coupon prorated values between both carriers from E-ticket issuance and before coupon usage.

Further, based on E-ticket information and said exchange of coupon prorated values, the invention is arranged to launch an agreement process before or at a time of providing the transportation service.

Another aspect of the invention is that information on coupon prorated value is embodied within industry standard messages that are already exchanged in current processes.

25 Claims, 7 Drawing Sheets

AGREEMENT METHOD AND SYSTEM TO CONSENT TO A PRORATED VALUE OF COUPON OF AN INTERLINE E-TICKET

FIELD OF THE INVENTION

The present invention generally relates to the field of interline revenue sharing for transports comprising services provided by different carriers. More particularly, the invention addresses the problem of agreeing on the revenue share for each carrier involved in a multi-segment transport.

BACKGROUND OF THE INVENTION

The invention extends to all kinds of transportation modes and turns out to be particularly attractive for air transport. Therefore, the invention will be mainly described in connection with airline business.

A passenger itinerary can contain flights involving different carriers. Such an itinerary is usually designated "interlining" or "intercarrier" itinerary. Each flight of the itinerary is designated "segment". A "programmed interlining" can be either "roundtrip interlining" when passenger decides to fly with a first airline from point A to point B, and returns with a second airline from point B to point A, or "connection interlining" when a first airline carries passenger from point A to point B, and a second airline carries passenger from point B to point C. Another type of interlining is called "flexibility interlining": once the passenger bought his/her ticket for a travel on a given flight, (s)he has to possibility either to switch airline or to change his/her routing within the maximum allowed deviations.

Intercarrier systems offer worldwide connectivity, thus enabling passengers to travel efficiently and economically on international networks. As for the air transport, such intercarrier systems, designated interlining systems, are particularly well developed. The benefit for passengers is a multitude of fares to choose from, thus allowing the selection of the most preferred and economical route served by interlined carriers. Moreover, interlining systems provide flexibility and ease of use by allowing one single payment in one single currency for the whole multi-segment travel. The benefit for interlining carriers is to access each other's networks, thus providing to airline passengers a seamless travel to more than 4,000 airports around the globe.

When several carriers, also called airlines, are involved in providing the transportation service to the passenger, one carrier is chosen to be the validating carrier, also called "validating airline" for the ticket. This validating carrier is designated in the present application by the initials VC. The remaining carriers involved in the multi-segment travel are usually called "participating airlines" or "participating carriers" and are designated by the initials PC in the following.

The interlining systems could not operate efficiently unless the involved carriers have an agreed mechanism for managing data and monetary flows.

The problems addressed by the present invention will be better understood through an example explaining how the data and monetary flows are currently carried out in interlining.

Traditional travel agencies (TA) and other travel service providers use computerized travel search tools to handle the travel requests of their customers. To be able to offer this service, they are generally affiliated with a global distribution system (GDS) such as AMADEUS, a worldwide provider of technology solutions to the travel industry. GDSs have large proprietary computer systems allowing real-time access from all over the world to airline fares, prices, schedules and seating availabilities. They are thus offering the capability of booking flights through all sorts of travel service providers. This includes numerous online travel agencies (OLTA) that now offer their services directly to travelers over the Internet under the form of websites.

When a customer buys a ticket for an airline trip, the three steps usually followed by a travel agent (TA) connected to the GDS are the following:

Booking: this refers to checking for availability and actually making a booking: for example, the passenger wants to fly from Paris to Sydney on 1 Jan. 2008, and this trip involves two airlines, such as Air France (AF) on the CDG-SIN (Paris-Singapore) segment, and British Airways (BA) on the SIN-SYD (Singapore-Sydney) segment. The inventories of both airlines will be checked for availability and a booking for each segment will be done, thus decrementing the inventories of AF and BA.

Ticketing: a price tag is put on the trip (made with the help of Fare engines), and one airline (for example AF) is chosen to be the validating airline VC. The validating carrier collects the total revenue for the whole multi-segment travel.

Travel (coupon usage): the passenger flies on each segment of his/her trip, i.e. uses the service he/she has paid for. Then the total revenue has to be redistributed between all the involved carriers. The revenue share is calculated for each participating airline and is redistributed to them once the transportation service is provided.

More precisely, the travel agency TA reports the sale on behalf of the validating airline VC to a system called Billing and Settlement Plan or Airline Reporting Corporation designated by BSP in the following. A BSP is basically a system designated to facilitate the reporting and remitting procedures. The BSP is then in charge of informing the validating airline VC of the sale and, usually, the BSP also performs the settlement between the travel agency and the validating airline.

It can easily be seen that, although the participating carrier knows about the booking due to the decrementation of its inventory, it has no idea of the revenue associated to the service that it is expected to provide. Indeed, the ticket sale was only reported to the validating carrier but not to the participating carrier. Participating airlines may be informed of the sale by subscribing to an additional service offered by companies like Airline Tariff Publishing Company ATPCO. However it is not guaranteed that all sales will be reported to these companies.

Determination of Revenue Share

Multilateral prorate agreements (MPA) are promoted by an international association called the International Air Transport Association IATA. These agreements rest on tariff coordination. However, settlement amounts are linked to the fare level, which leads to the situation where the participating carrier receives an amount that depends on the fare set by the validating airline.

Methodologies were set out for the sharing of revenue produced by interlining. For example, the simplest one is called straight Rate Prorate, which means in simple terms that revenue is shared on the basis of mileage flown. If one airline flies a passenger 800 miles and another 200 miles, the revenue share is 80/20. An extension of above method exists, named "provisos", and is intended to compensate airlines operating in high cost environments, e.g. the higher cost of short distance sectors. This is particularly important for small airlines, which often perform shorter sector services than the large airlines. These provisos are exceptions to the straight rate proration methodology, filed by airlines, through which they stipulate a percentage of a base amount or rate as the share of the revenue they require for interlining on a particular sector.

The Multilateral Prorate Agreements also include a mechanism to ensure that provisos are not applied where they would result in an unreasonably low revenue share for any of the airlines involved.

However, nowadays multilateral interlining is often done through unilaterally set carrier-coded fares, and airlines are creating interline fares with little or no regard to the amount payable to the other airlines involved. This situation led to a flourishing development of bilateral agreements. Most interline revenue is now governed by Special Prorate Agreements, with nearly one out of every three airlines having more than 75% of their interline revenue covered on a bilateral basis.

Sampling

Due to the high cost of getting ticket information, running proration algorithms, producing and verifying the billings, the airlines have agreed on a workaround named sampling. The "sampling" method was based on the fact that re-keying manually the paper tickets inside the Revenue Accounting of the participating airline was heavily time-consuming, and the complexities of fares, proration and currency regulations increased the cost level of interline accounting. Basically, instead of billing the validating airlines on each coupon, the participating airlines agree on an exact evaluation of a percentage of the total flight coupons. Then they deduce the total value of all coupons based on that sample of the evaluated coupons.

Due to the huge variance in the coupon values, such method implies an inaccuracy that is not acceptable for an efficient management of airlines revenue.

Billing and Settlement of Revenue Sharing

In agreement with IATA procedures, interline transactions are accounted for by an invoice issued by the creditor airline (participating airline) charging the debtor airline (validating airline). Interline invoices for flight and excess baggage fares must be supported by the actual flight coupons, miscellaneous charge orders or other documents for the journey involved. No flight coupons need be present to support electronic ticket billings.

The IDEC (Interline Data Exchange Center) file is an electronic version of the hard-copy coupon listing and invoice. Each airline sends an invoice file to the IDEC processing centre at ATPCO, containing details of documents billed to other participants and receives from the centre a file containing details of its documents billed by the other participants. The IDEC eliminates the need for the receiving airline to duplicate the input of data already performed by the billing carrier.

Invoices sent by participating airlines are loaded by the validating airline as IDEC files designated billing files in the following. Incoming billed values are checked for fare and taxes against the provisional values already stored in the validating Revenue Accounting database, before accepting the billing. If billed value is higher than stored value, the coupon will be flagged for review and may be re-prorated. If the difference is still not acceptable, rejection will be initiated.

According to the IATA Revenue Accounting Manual, up to three rejections are possible. Then if no agreement is found, a correspondence between airlines may be initiated.

For example, if a participating carrier bills the validating carrier, the first rejection corresponds to the case where the validating carrier cannot accept original debit and re-debits the participating carrier. The second rejection occurs when the bill submitted by the validating carrier to the participating carrier (giving reason for debit) is rejected by the participating carrier. The third rejection occurs when the bill submitted by participating carrier to validating carrier as second rejection is rejected by the validating carrier. Each rejection must be billed not later than six months after date of receipt of original billing, or of previous rejection. This current process may last up to two years after flight departure.

Such process implies many drawbacks.

Indeed, reaching an agreement may take a very long time. Yet, the efficiency of the financial operations management is critical to the profitability of all airlines. Thus, delaying the time of being certain of the revenue associated to a service already provided prevents any efficient management.

Moreover, an efficient financial management would imply to foresee as soon as possible the revenue that is expected to be earned from coupon corresponding to a service which has not been provided yet.

Besides, such dispute procedures necessitate tedious actions handled by employees and turns out to be time and money consuming for airlines.

A number of solutions have been developed to try to diminish these significant drawbacks. The main solutions are explained in the following.

"First and Final" Solution

In order to speed up the above described procedure, a process called "First and Final Billing and Settlement" has been proposed to the airlines. The objective is that the processes used to evaluate interline settlement amounts are such that the carrier being billed has sufficient confidence to accept the invoice without further verification.

This process provides carriers with prorated values calculated with a public proration engine to be chosen amongst two engines operated by neutral parties. When the billing is conform to the values sent as output by the neutral prorating engine, the bill is flagged "First and Final conform", and the carriers do not need to verify further the billing values.

However, only one carrier determines the choice of the public proration engine. Thus, such agreement is rather imposed on the other carrier. Besides, this method prevents auditing of the fare amount. Thus, such solution limits the carriers' independence.

Agreements Within Alliances

Another attempt to simplify these procedures and to reduce the time spent in prorating the tickets and in verifying the billings was done by internal alliance agreements.

When both validating and participating airlines belong to an alliance applying this method, the participating airline initiates a "request-response" process. Instead of running the proration algorithm to assess the coupon value, the participating airline asks the validating airline how much the coupon is worth Then the billing is done, without further verification, based on this value.

Such solution enables significant time savings but does imply that the validating airline imposes its own value without any possibility for the other airline to dispute it. Therefore, such solution turns out to be convenient only between closely linked airlines but cannot be implemented in large scale with many competitors, since it removes the independence of the participating airline.

Both methods exposed above reduce the disputes by imposing the value calculated by an airline (usually the validating) over the other airline (usually the participating).

Therefore, there exists a significant need to provide a method enabling to limit at least some of the above-mentioned drawbacks of the existing methods. In particular, it would be very profitable for airlines to be provided with a method that significantly speeds up the procedure for reaching an agreement regarding coupon prorated value, without having recourse to restrictive solutions leading to independence abandonment.

It is another object of the invention to reduce the number of dispute cases without increasing administrative charges.

A further object of the invention is to know earlier the revenue expected from a given coupon before the service corresponding to this coupon is actually provided.

It is a further object of the invention to reduce the duration of dispute.

SUMMARY OF THE INVENTION

The invention describes an enhanced method and an enhanced system for reaching an agreement regarding the revenue related to a coupon of an E-ticket corresponding to a transport service involving a validating carrier and at least a participating carrier.

The invention relies on a new system architecture that enables the validating carrier and the participating carrier to exchange information regarding the E-ticket, the coupon and the coupon prorated value upon issuance or modification of the E-ticket, and before the usage of the coupon.

The agreement system is also arranged to launch an agreement process before providing the service related to said coupon.

Then at coupon usage both carriers know if an agreement has been reached regarding a given coupon. Therefore, upon coupon invoicing, both carrier also know, without requiring any further checking, if the invoice will be paid or if a dispute process will be necessary.

According to an advantageous embodiment, the agreement system enables synchronous exchanges between the various modules related to a given carrier. Therefore, the prorated value can be calculated by said given carrier upon reception of said information.

Besides, according to a useful aspect, the agreement system enables synchronous exchanges between the validating carrier and the participating carrier. Therefore, the agreement process can be launched at an early stage preceding coupon usage.

Another advantage of the invention is that information on coupon prorated value and on agreement is embodied within industry-standard messages that are already exchanged in current processes. Therefore, the number of communications between carriers is not increased and the process according to the invention is not significantly more complicated than the current processes.

More precisely, the invention relates to an agreement method to consent to a prorated value of a coupon of an E-ticket, wherein the E-ticket corresponds to a transport service involving a validating carrier VC and at least a participating carrier PC expected to provide the transportation service on said coupon, the method including the following steps from issuance or from modification of the E-ticket and before the usage of said coupon:
- an E-ticket server system VC related to the validating carrier generates or updates the E-ticket and sends to an E-ticket server system PC related to the participating carrier information regarding said E-ticket and said coupon,
- a first carrier, taken among the validating carrier VC and the participating carrier PC, calculates, through a proration module related to said first carrier, a prorated value $PV_1$ corresponding to said coupon based on predefined prorating rules and on said information regarding said E-ticket and said coupon,
- said first carrier sends to a second carrier said prorated value $PV_1$, the second carrier being taken among the validating carrier VC and the participating carrier PC, and being different from the first carrier.

Optionally, the invention also includes any of the steps indicated below. All these steps described in the following of the present summary occur from issuance or from modification of the E-ticket and before the usage of said coupon unless indicated otherwise.

The second carrier calculates, through a proration module related to said second carrier, a prorated value $PV_2$ corresponding to said coupon based on predefined prorating rules and on said information regarding said E-ticket and said coupon, An acceptance module related to said second carrier calculates the difference between said $PV_1$ and said $PV_2$, and determines from said difference and from a given threshold T1SC whether it accepts the prorated value $PV_1$, The second carrier indicates to the first carrier whether it accepts the $PV_1$ by sending to the first carrier a first flag indicator, the first flag indicator being an acceptance flag indicator (OK flag indicator) in case the second carrier accepts the $PV_1$ or being a rejection flag indicator (KO flag indicator) in case the second carrier does not accept the $PV_1$.

Further, in case the first flag indicator is an acceptance flag, then the first carrier informs a revenue accounting module related to the first carrier that an agreement has been reached regarding said coupon and/or the second carrier informs a revenue accounting module related to the second carrier that an agreement has been reached regarding said coupon. Then, the prorated value for which an agreement has been reached is sent to the revenue accounting modules of each carrier.

Further, in case the first flag indicator is a rejection flag, the first carrier receives the prorated value $PV_2$ and after an possible recalculation of the prorated value $PV_1$, calculates the difference between said $PV_1$ and said $PV_2$, and determines from said difference and from a given threshold T2FC whether it accepts the prorated value $PV_2$. Then, the first carrier can indicate to the second carrier whether it accepts the $PV_2$ by sending to the second carrier a second flag indicator, the second flag indicator being an acceptance flag indicator (OK flag indicator) in case the first carrier accepts the $PV_2$ or being a rejection flag indicator (KO flag indicator) in case the first carrier does not accept the $PV_2$.

Further, in case the second flag indicator is an acceptance flag, then the first carrier informs a revenue accounting module related to the first carrier that an agreement has been reached regarding said coupon and/or the second carrier informs a revenue accounting module related to the second carrier that an agreement has been reached regarding said coupon. Then, the prorated value for which an agreement has been reached is sent to the revenue accounting modules of each carrier.

In case the second flag indicator is a rejection flag, the second carrier receives the prorated value $PV_1$ and after an possible recalculation of the prorated value $PV_2$, calculates the difference between said $PV_1$ and said $PV_2$, and determines from said difference and from a given threshold T3SC whether it accepts the prorated value $PV_1$.

Further the second carrier indicates to the first carrier whether it accepts the $PV_1$ by sending to the first carrier a third flag indicator, the third flag indicator being an acceptance flag indicator (OK flag indicator) in case the second carrier accepts the $PV_1$ or being a rejection flag indicator (KO flag indicator) in case the second carrier does not accept the $PV_1$.

In case the third flag indicator is an acceptance flag, then the first carrier informs a revenue accounting module related to the first carrier that an agreement has been reached regarding said coupon and/or the second carrier informs a revenue accounting module related to the second carrier that an agreement has been reached regarding said coupon. Then, the prorated value for which an agreement has been reached is sent to the revenue accounting modules of each carrier. Further, the participating carrier can generate an invoice corresponding to the prorated value of said coupon and stores and/or sends the invoice with the third flag indicator.

In case the third flag indicator is a rejection flag, then the revenue accountings of both carriers are informed that no agreement has been reached regarding said coupon and/or the first or the second carrier may launch a dispute process once the transportation service associated to said coupon is provided.

According to advantageous aspects, the agreement method of the invention comprises any of the following features that occur from issuance or from modification of the E-ticket and before the usage of said coupon unless indicated otherwise.

Any of the various thresholds can be based on the information regarding said E-ticket and coupon and/or depends on business rules.

Any of the various flag indicators can be sent in real-time. Besides, any of the various flag indicators can be sent along with industry-standard messages.

When an acceptance module of a given carrier rejects the prorated value that is claimed by the other carrier, then the flag indicator indicating this rejection can be sent in real time with the prorated value as calculated or as recalculated by said given carrier.

Besides, when an acceptance module of a given carrier rejects the prorated value that is claimed by the other carrier, then the prorated value as calculated or as recalculated by said given carrier can be sent along with an industry-standard message.

Whatever the number of agreement attempts that occur, the prorated value PV for which an agreement has been reached can be automatically sent to the revenue accounting modules of each carrier.

Once available at the E-ticket server system of a given carrier, said information is provided in real time to the proration module of said given carrier.

Once calculated by the proration module of a given carrier, the prorated value is provided in real time to the E-ticket server system of said given carrier.

When the first carrier is the validating carrier and the second carrier is the participating carrier, the invention optionally includes any of the following steps which occur from issuance or from modification of the E-ticket and before the usage of said coupon unless indicated otherwise:

the validating carrier sends to the participating carrier the prorated value PV1 along with an UAC message or a response to a RAC message, the participating carrier sends to the validating carrier the first flag indicator and/or the $PV_2$ along with an SAC request message, the validating carrier sends to the participating carrier the second flag indicator and/or the $PV_1$ along with an SAC response message, once the service related to said coupon is provided, the participating carrier sends to the validating carrier the third flag indicator and/or the $PV_2$ along with an invoice file.

When the first carrier is the participating carrier and the second carrier is the validating carrier, the invention optionally includes any of the following steps that occur from issuance or from modification of the E-ticket and before the usage of said coupon unless indicated otherwise:

the participating carrier sends to the validating carrier the prorated value PV1 along with an SAC request message, the validating carrier sends to the participating carrier the first flag indicator and/or the $PV_2$ along with an SAC response message, the participating carrier sends to the validating carrier the second flag indicator and/or the $PV_1$ along with an invoice file, in case the second flag is a rejection flag, then the first or the second carrier may launch a dispute process once the service related to said coupon is provided.

The invention also relates to an agreement system to consent to a prorated value of a coupon of an E-ticket, wherein the E-ticket corresponds to a transport service involving a validating carrier VC and at least a participating carrier PC expected to provide the transportation service on said coupon, the system comprising:

an E-ticket server system VC and a proration module VC related to the validating carrier, an E-ticket server system PC and a proration module PC related to the participating carrier, the E-ticket server system VC and the E-ticket server system PC being capable of containing, sending and receiving information regarding said E-ticket and said coupon, the proration module VC and the proration module PC being arranged to calculate a prorated value PV corresponding to said coupon based on predefined prorating rules and said information, from issuance or modification of the E-ticket and before the usage of said coupon the E-ticket server system VC sends to the E-ticket server system PC said information, the system being arranged so that:

from issuance or from modification of the E-ticket and before the usage of said coupon a first carrier, taken among the validating carrier VC and the participating carrier PC, calculates and sends a prorated value $PV_1$ to a second carrier, said second carrier being taken among the validating carrier VC and the participating carrier PC, and being different from the first carrier.

Optionally, the agreement system also comprises any of the following features:

it comprises online links arranged so that the prorated value $PV_1$ is sent in real time from issuance or from modification of the E-ticket, it comprises online links arranged so that, upon reception of said information, said given carrier calculates in real time through its proration module its own prorated value, it comprises online links arranged so that, upon reception of the prorated value calculated by the other carrier, said given carrier compares its own prorated value to the prorated value received from the other carrier it is arranged so that each carrier determines through an acceptance module whether it accepts or it rejects the prorated value as calculated by the other carrier it is arranged so that each carrier indicates the other carrier whether it accepts or it rejects the prorated value as calculated by the other carrier by sending to said other carrier a flag indicator, it is arranged so that the prorated values and/or the flag indicator are sent along with industry-standard messages.

DETAILED DESCRIPTION

The following detailed description of the invention refers to the accompanying drawings.

While the description includes exemplary embodiments, other embodiments are possible. Changes may be made to the embodiments described without departing from the spirit and the scope of the invention. In particular, the following examples relate to air transportation business but the invention extends to all kind of transportation modes such as ground and sea transport. Besides, the invention extends whatever the travel involves a single transportation mode or a plurality of transportation modes.

First Example

Figure 1:
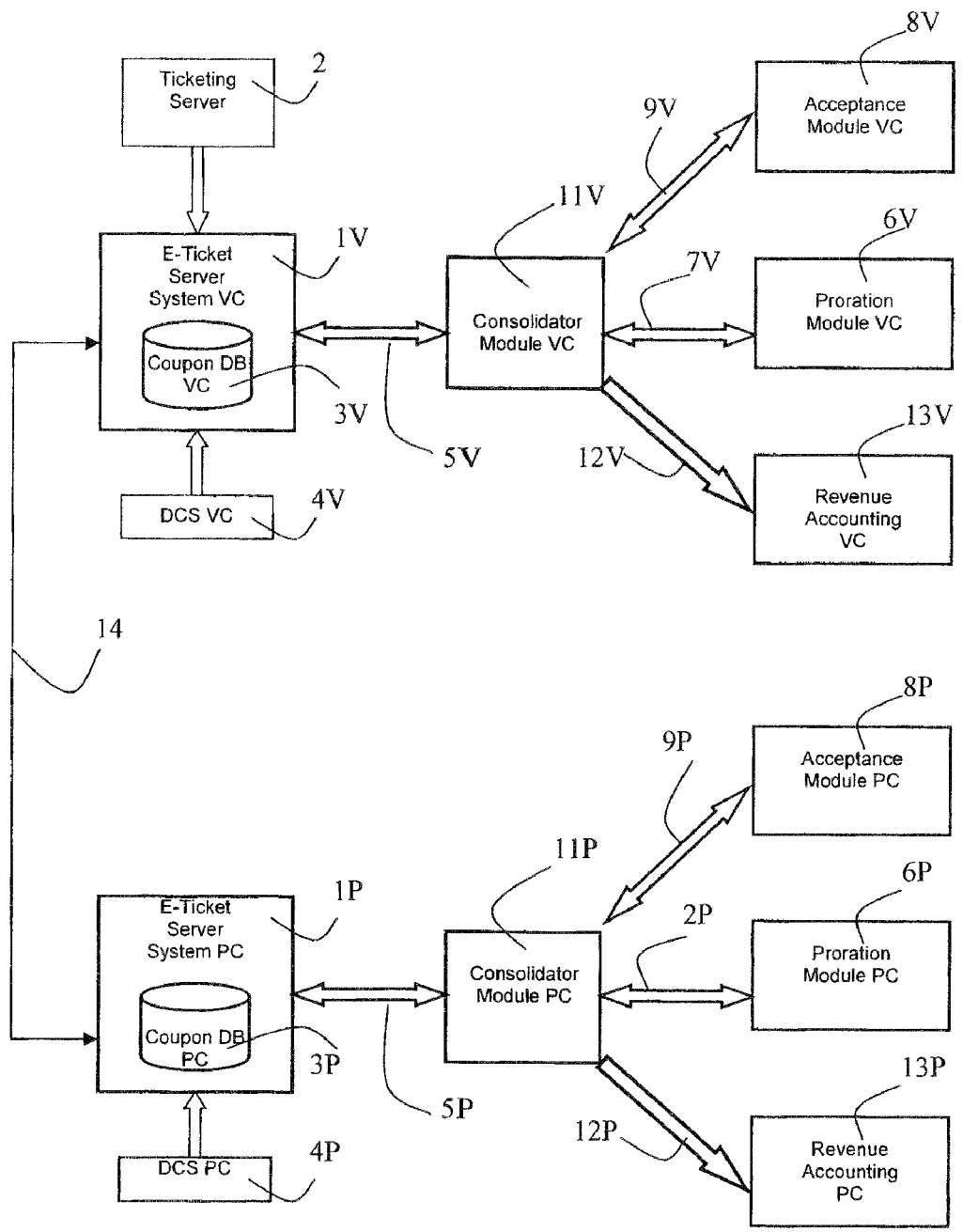
FIG. 1 is a schematic diagram of an agreement system according to a an example of the present invention.
Figure 2:
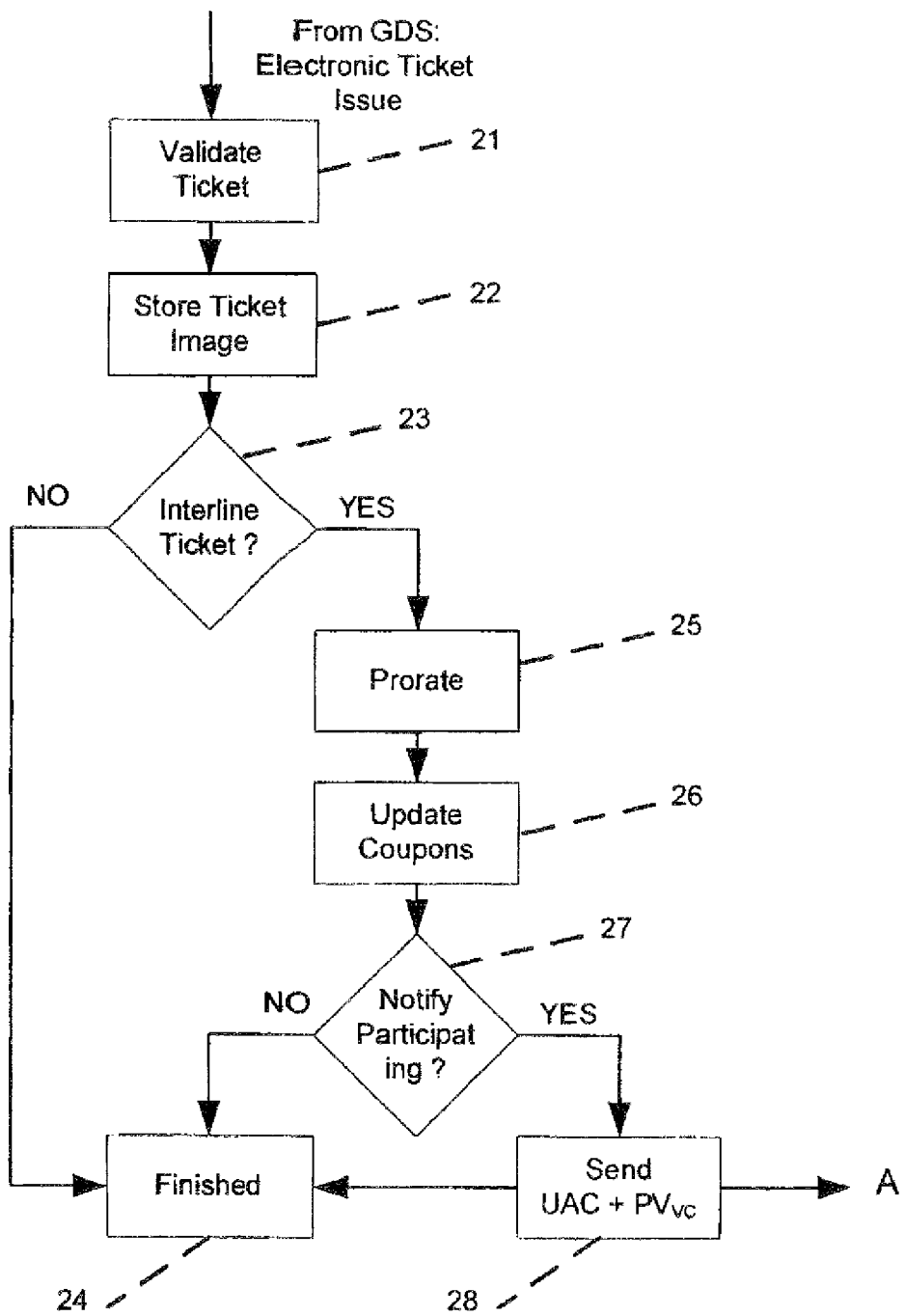
FIG. 2 is a flowchart of the process according to the invention performed at the validating carrier side upon E-ticket issuance or update.

Referring to FIG. 1, the main components of the agreement system according to a first example of the invention are illustrated.

For the sake of clarity, the above-illustrated example relates to a travel which involves a validating carrier and a participating carrier. The man skilled in the art will easily duplicate or adapt the illustrated example to take advantage of the invention in a travel involving more than one participating carrier.

In the following, an interline E-ticket or an intercarrier E-ticket means that the travel corresponding to this E-ticket involves a validating carrier as defined earlier and at least a participating carrier The participating carrier is expected to provide a service related to at least a segment corresponding to a coupon of the E-ticket. The validating carrier is usually also intended to provide the transportation service on a segment but may also not be involved in the passenger trip. For understanding's sake in the following example, the E-ticket comprises at least one coupon corresponding to transportation on a segment expected to be provided by the participating carrier.

The agreement system comprises an interline revenue share administration on the validating carrier side and an interline revenue share administration on the participating carrier side.

The interline revenue share administration on the validating carrier side and on the participating carrier side include substantially the same components.

The interline revenue share administration on both validating carrier and participating carrier sides comprise respectively an Electronic Server System 1V, 1P and a coupon database 3V, 3P, a proration module 6V, 6P, an acceptance module 8V, 8P, a revenue accounting 13V, 13P and a consolidator module 11V, 11P.

Preferably, the Electronic Server System 1V, 1P hosts the coupon database 3V, 3P.

The agreement system also includes connection means 5V, 7V, 9V, 5P, 7P, 9P arranged for enabling online and both-way connection between the consolidator module 11V, 11P and respectively the Electronic Server Systems 1V, 1P, the coupon database 3V, 3P, the proration module 6V, 6P, and the acceptance module 8V, 8P. The agreement system also includes connection means 12V, 12P arranged for enabling online and one-way connection between the consolidator module 11V, 11P, and the revenue accounting 13V, 13P.

The E-ticket server system 1V is connected to a ticketing server 2 and both E-ticket server systems 1V, 1P are able to process all the functionalities of a conventional E-ticket server system. The E-ticket server systems 1V, 1P gather data from all sales distribution channels providing therefore a complete view of the airlines sales provided that all tickets are E-ticket. Therefore, the E-ticket server systems 1V, 1P store all sales, reimbursement, exchanges, cancellation data regarding E-ticket and their associated coupons.

Besides, as in the existing systems, the E-ticket server systems 1V, 1P are also respectively connected to a conventional Departure Control System (DCS).

The agreement system also comprises connection 14 for enabling communication between the E-ticket server systems of both VC and PC.

For the sake of clarity, in the following, the various components of the agreement system on the validating carrier side are followed with the initials VC, which indicates that they relate to the validating carrier. Likewise, the various components of the agreement system on the participating carrier side are followed with the initials PC, which indicates that they relate to the participating carrier.

With reference to FIG. 2 to FIG. 6, the main steps of the method and the main features of each component of the agreement system will be further described.

When a passenger wants to purchase an E-ticket, the ticketing server asks the E-ticket server system VC 1V to issue the E-ticket. As represented at step 21, the E-ticket VC performs conventional checks for validation and creates an E-ticket corresponding to the passenger request. The E-ticket contains one coupon per segment.

An image of the E-ticket is then stored in a coupon database 3V (step 22).

In the present invention the information to be stored and which corresponds to the E-ticket is enriched.

Thanks to the online link 5V, the airline E-ticket server system VC interrogates the consolidator module VC 11V in real-time, and provides it with an E-ticket full image. The E-ticket full image includes the E-ticket information plus coupon information.

As represented in step 23, the system VC determines whether the E-ticket is an interline E-ticket.

In case the validating carrier determines that the E-ticket is not an interline E-ticket, then the process continues as per prior art (step 24).

In case the validating carrier determines that the E-ticket is actually an interline E-ticket, the consolidator module VC 11V will, in real-time, thanks to the online link 7V, request the prorating module VC 6V and send it the E-ticket full image in order to obtain in real-time the coupon prorated values.

The proration module VC 6V calculates a prorated value VC for each coupon of the E-ticket (step 25). This calculation is based on predefined prorating rules and on information comprised in said E-ticket full-image and which regards the E-ticket and said coupons.

The coupon prorated value as calculated by the validating carrier is designated by the initials $PV_{VC}$ in the following.

These values are sent back from the proration module VC 6V to the consolidator module VC 11V thanks to the online link 7V.

Then the consolidator module VC 11V sends back these coupon prorated values to the E-ticket Server VC 1V, and also sends the E-ticket image and the coupon prorated values to the Revenue Accounting VC 13V of the validating airline, thanks to the online link 12V.

The E-ticket server VC 1V then stores in the Coupon Database VC 3V the full E-ticket image, plus the coupon prorated values.

Now the E-ticket issuance (or update) is completed on the validating airline side.

The synchronous and both-way links between the consolidator module VC 11V and the other components represent fundamental features of the present invention. Indeed, such links enable automatic and real-time update of the data associated to an E-ticket and its coupons. Therefore, the revenue, which may be expected by the validating carrier from each coupon, is known at a very early stage, which enables a more accurate management of the validating carrier's revenue.

As a reminder, at this stage, in the existing method, the prorated value of a given coupon has been unilaterally determined by the validating carrier. Besides, until the service corresponding to said coupon is actually provided by the participating carrier, its value cannot be regarded as an earned revenue. In particular, prior to flight departure, said coupon may be refunded, exchanged or modified. Thus a ticket sale is first recorded as "unearned" revenue (as recorded by the validating) or "planned" revenue (as recorded by the participating). It becomes "earned revenue" only once the transportation service has been provided.

However, knowing at an early stage the "planned" or "unearned" revenue associated to a coupon obviously facilitates revenue accounting.

Thanks to the synchronous links, any change made to the E-ticket will be automatically reported to the validating carrier and its revenue accounting 13V, improving therefore the reliability of revenue accounting in carrier companies.

Besides, thanks to the synchronous links, whenever the E-ticket is modified (refunded, exchanged, etc), a process similar to the issuance process takes place.

Therefore, the invention enables to perform an automatic proration online and triggered by the E-ticket processes.

At step 27, the validating carrier determines whether to notify the participating carrier of the issuance (or update) of the E-ticket.

In the negative, the process ends (step 24).

In the affirmative, the E-ticket server system VC 1V sends to the E-ticket server system PC an Unsolicited Airport Control message, designated in the following by UAC message.

An UAC message is a globally used and industry-standard message in air transport and shall be sent by a validating carrier to all participating carriers. The UAC message shall include the E-ticket full image, which comprises all sold coupon data, and current coupon data, when different from sold, associated to the ticket.

An innovative feature of the invention relies on the fact that prorated values can be sent along with industry-standard messages such as the UAC message. Then, in the present example the validating carrier includes along with the UAC message the $PV_{VC}$ of the coupon(s), for which the transportation service is expected to be provided by the participating carrier. In such example, the "first carrier" as mentioned above in the summary of the invention is the "validating carrier".

Thanks to the online connections 5V, 7V, 9V, 12V on the validating carrier side, and thanks to the online connection 14 between the E-ticket server system VC 1V and the E-ticket server system PC 1P, the emission of the UAC along with the $PV_{VC}$ occurs immediately after E-ticket issuance (or update).

As the prorated value is conveyed along with a standard and required message, the number of communications between the carriers is not increased and the invention does not make the current process significantly more complicated.

This feature is represented in step 28, and its consequences will be more apparent below.

In the existing process, another way for the participating carrier to obtain the e-ticket image is that the participating carrier requests the control over its coupons. Such request is done via a Request Airport Control message sent from the participating carrier to the validating carrier. Such message is also a widely employed standard message in airline industry and is designated by RAC message. Basically, the participating carrier sends RAC message to the validating carrier which in turns transmits a response to the RAC message. In the present invention, a UAC message designates a UAC message as well as a response to the RAC message.

In the present invention, the validating carrier transmits to the participating carrier the RAC response along with the $PV_{VC}$.

Figure 3:
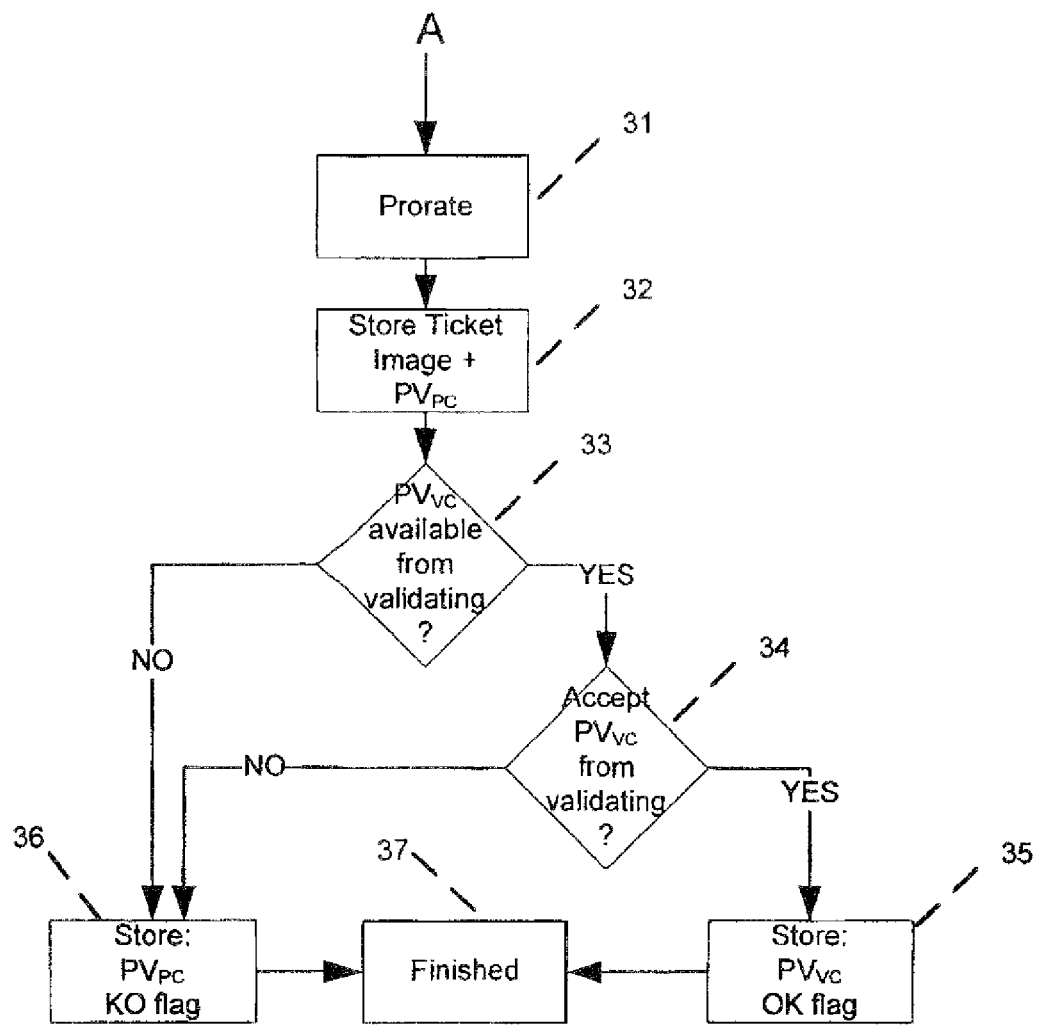
FIG. 3 is a flowchart of the process according to the invention performed at the participating carrier side after E-ticket issuance or update.

Referring to FIG. 3 a flowchart of the process according to the invention occurring after UAC message emission is illustrated from the participating carrier side.

The E-ticket server system PC 1P receives from the validating carrier by means of UAC message or response to a RAC message and stores the E-ticket full image with the $PV_{VC}$ in the coupon database 3P related to the participating carrier.

Then the invention proposes that the E-ticket server PC 1P, whenever receiving an UAC message calls online its consolidator module PC 11P, providing it with the full E-ticket image.

This consolidator module 11P then calls, thanks to the online link 7P, the prorating module 6P of the participating airline with the full E-ticket image and gets back the coupon prorated value, as calculated by the participating airline (step 31). This calculation is of course based on the E-ticket full image, on coupon information and on prorating rules.

This prorated value as calculated by the participating carrier is designated by the initials $PV_{PC}$ in the following.

In step 32, the information of the UAC message and the $PV_{PC}$ are stored in the coupon database PC 3P.

Then, as represented at step 33, the participating carrier checks whether a prorated value has been provided by the validating carrier.

In the affirmative, the consolidator module PC 11P then requests the Acceptance Module PC 8P thanks to the online link 9P and provides it with both $PV_{VC}$ and $PV_{PC}$.

The Acceptance Module PC 8P is in charge of evaluating the difference between $PV_{PC}$ and the $PV_{VC}$ and to deliver a first flag indicator based on various business rules, also designated in the following by first acceptance flag to the consolidator module PC 11P (step 34).

In the following, a flag indicator indicates whether the acceptance module of a given carrier accepts (OK flag indicator) or rejects (KO flag indicator) the prorated value calculated by the other carrier.

As represented in step 35, if said $PV_{PC}$ is less or equal to said $PV_{VC}$, or if the difference between said $PV_{PC}$ and said $PV_{VC}$ does not exceed a given threshold T1PC calculated thanks to business rules, then the Acceptance Module PC 8P delivers to the consolidator module PC 11P an OK first flag indicator. Such a first flag indicator means that the participating carrier accepts the prorated value as calculated by the validating carrier.

Therefore, the invention enables both carriers to know before the passenger travels that an agreement has been reached.

Then the consolidator module PC 11P sends back to the E-ticket server system PC 1P the OK first flag indicator along with the prorated value as evaluated by the validating carrier and agreed by the participating carrier.

As represented in step 36, if said difference does exceed a given threshold T1PC, then the Acceptance Module PC 8P delivers to the consolidator module PC 11P a KO first flag indicator.

In case the validating carrier has not provided so far the participating carrier with a $PV_{VC}$, then no comparison can be performed by the Acceptance Module PC 8P. Thus no agreement can be reached at this stage. Therefore, the Acceptance Module PC 8P will automatically deliver a KO first flag indicator (step 36).

Then the consolidator module PC 11P sends back to the E-ticket server system PC 1P the KO first flag indicator along with the $PV_{PC}$ as claimed by the participating carrier. In such case, the participating carrier is the first of the two carriers which sends a prorated value to the other carrier. Thus in such case the "first carrier" as mentioned in the above summary of the invention is the participating carrier.

Simultaneously, the consolidator module PC 11P informs in real-time thanks to the online link 12P the Revenue Accounting PC 13P of the E-ticket image and the coupon prorated value. This latter coupon prorated value is $PV_{VC}$ in case the acceptance module PC 8P has delivered an OK first flag indicator or is $PV_{PC}$ in case the acceptance module PC 8P has delivered a KO first flag indicator.

The participating E-ticket server system PC 1P then stores in its Coupon Database PC 3P the full E-ticket image, plus said coupon prorated value and the first flag indicator.

Then at this step the participating carrier knows whether an agreement has already been reached between the participating carrier and the validating carrier for the determination of the coupon value.

In case the first flag indicator is the OK flag indicator, the participating carrier already knows that no dispute should be engaged once the coupon is flown. Therefore, the revenue accounting PC 13P can take into account that no dispute is expected regarding this coupon and that the "planned" revenue will become an actual earned revenue once the service is provided. This enables to significantly improve the revenue accounting of the participating carrier. Indeed, with the existing processes, at this stage the participating carrier would not have any clue regarding either the "planned" revenue associated with the coupon or the risk of dispute.

Figure 4:
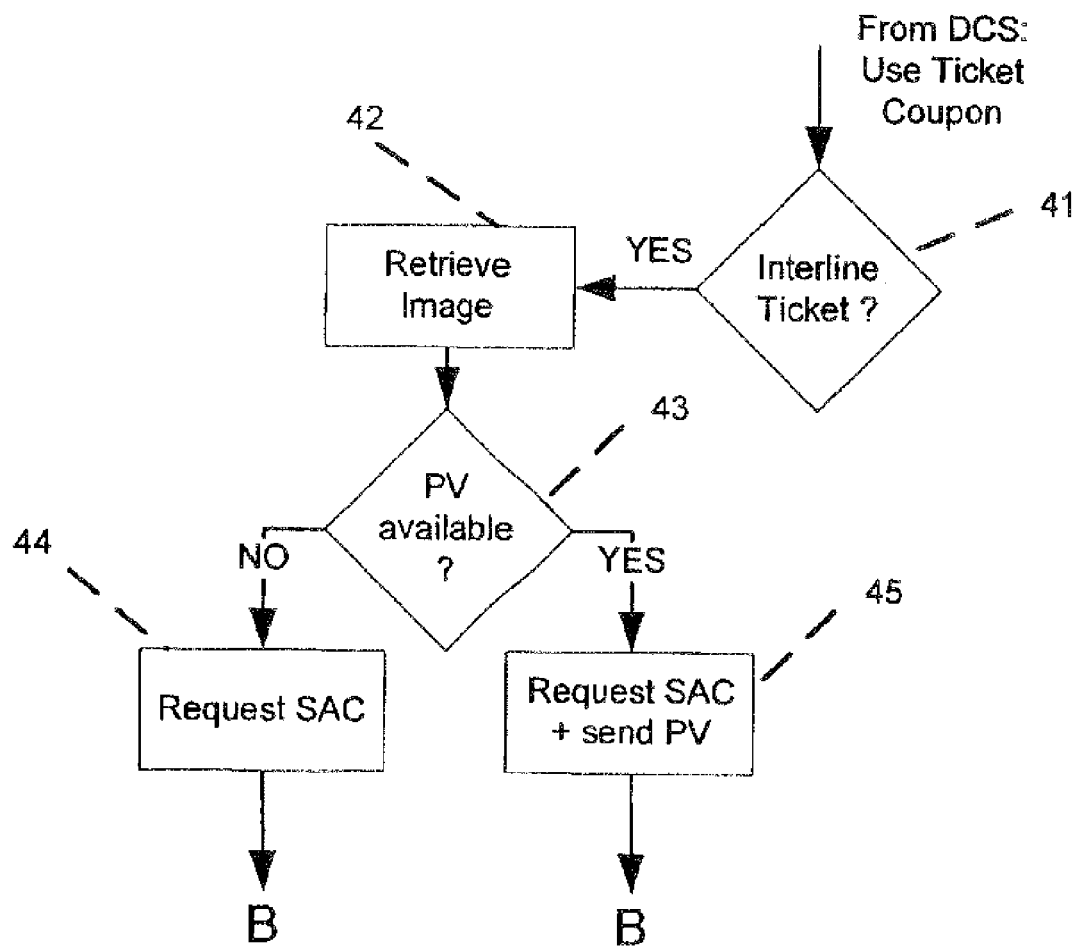
FIG. 4 is a flowchart of the process according to the invention performed at the participating carrier side when passenger is about to fly and SAC (Settlement Authorization Code) is requested to change the coupon status.

Referring to FIG. 4 a flowchart of the process of the invention occurring when the passenger wants to travel is illustrated from the participating carrier side.

When the passenger is about to travel on the participating airline, the Departure Control System (DCS) 4P of the participating airline informs the participating E-ticket Server 1P that a change of the coupon status is requested. This change of status is intended to take into account that the coupon is about to correspond to an actually completed travel. This status is usually designated as "flown".

At step 41 the participating carrier determines whether the E-ticket corresponds to an interline ticket.

In the affirmative, the E-ticket server system PC 1P retrieves the full-image of the E-ticket (step 42) and determines whether a prorated value is available for the coupon for which the change of status is requested (step 43).

In case no prorating value is available in the coupon database PC 3P, then the E-ticket server system PC 1P sends to the E-ticket server system VC 1V a classical Settlement Authorization Code request (step 44). Such a message, designated in the following by SACR message or settlement authorization code request message, is a widely used industry-standard message in airline industry. This settlement authorization code request message enables the participating carrier to ask the validating carrier a code by which the later approves that the coupon can be used, that is to say that the status of the coupon can be transformed into final status. As explained earlier, in air transport the final status is "flown". Therefore, the requested settlement authorization code is a code by which the validating carrier provides the participating carrier with an authorization for future settlement. The absence of prorated value at this stage may stem from the fact that, for instance, the participating carrier has not previously calculated a prorated value. This may be the case if the participating carrier has not been provided with sufficient information to calculate a prorated value.

In case a prorating value is available in the coupon database PC 3P, then the E-ticket server system PC 1P sends to the E-ticket server system VC 1V a message which comprises the conventional settlement authorization code request message. Besides, according to a fundamental feature of the invention, the settlement authorization code request message is enriched with the first flag indicator. Moreover, if the stored first flag indicator indicates that no agreement has been reached (KO first flag indicator), then the $PV_{PC}$ stored in the coupon database PC 3P is sent along with the settlement authorization code request message (step 45).

At this stage, a first <<dispute>> mechanism has been put in place, as the participating carrier informs the validating carrier whether the $PV_{VC}$ of the validating, as conveyed in the UAC or in the response to RAC message is acceptable.

As the prorated value and the flag indicator are conveyed along with a standard settlement authorization code request message, the number of communications between carriers is not increased and the process according to the invention is not significantly more complicated than the already existing processes.

Figure 5:
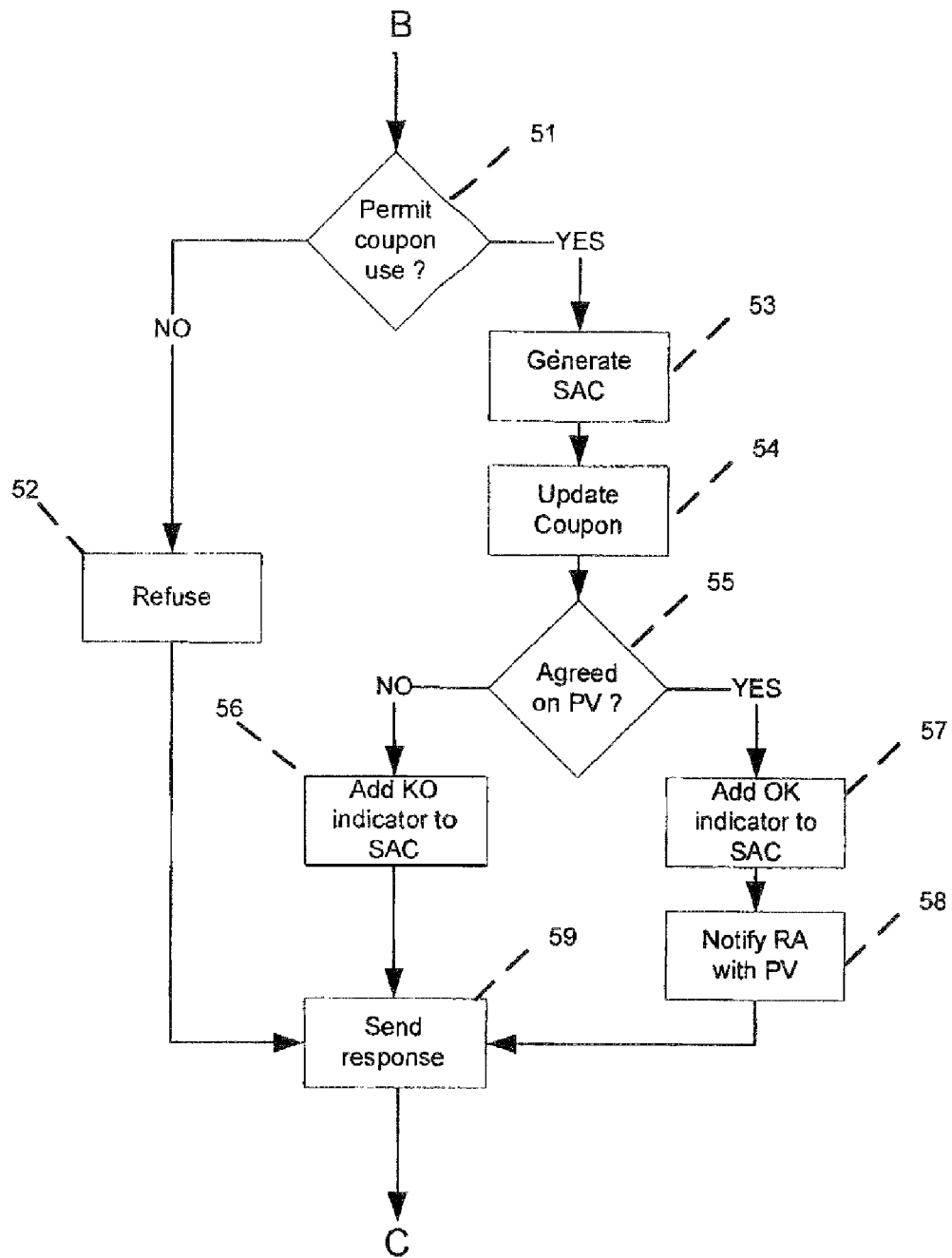
FIG. 5 is a flowchart of the process according to the invention performed at the validating carrier side when receiving the SAC request message.

FIG. 5 presents a part of the process of the invention occurring on the validating carrier side when the validating carrier receives the settlement authorization code request message from the participating carrier.

The E-ticket server system VC 1V receives with the settlement authorization code request message, the first flag indicator. In case the first flag indicator is a KO first flag indicator, the E-ticket server system VC 1V also receives the coupon $PV_{PC}$ that the participating carrier wants to claim.

As represented in step 51, the validating carrier determines whether the use of the coupon can be allowed.

This step is determined classically as in the prior art by the E-ticket server system VC 1V.

In case such use cannot be allowed, then the E-ticket server system VC 1V notifies the participating carrier that the validating carrier does not approve that the coupon can be used (step 52) the same way as it is done in prior art.

In case such use can be allowed, then the E-ticket server system VC 1V generates a Settlement Authorization Code (step 53), that will be conveyed in a SAC response message, and updates the coupon status in the coupon database VC 3V (step 54).

A settlement authorization code response message is an industry-standard message and the SAC will be used by the participating carrier as the proof that the validating carrier has acknowledged the coupon usage and, thus, that the latter agrees to be billed for this transportation service once provided.

Then the E-ticket server system VC 1V requests the consolidator module VC 11V, and provides it with:
the first flag indicator, and
the coupon value that was sent by the participating carrier with the settlement authorization code request message in case the first flag indicator is a KO first flag indicator,
the $PV_{VC}$ as stored in its Coupon Database VC 3V.

In case the first flag indicator is KO, or in case the $PV_{PC}$ given by the participating with the settlement authorisation code request message differs from the value calculated by the validating carrier, the consolidator module VC 11V calls the validating's Acceptance Module VC (8V) and provides it with both $PV_{VC}$ and $PV_{PC}$.

This Acceptance Module 8V responds with an OK or a KO second flag indicator also designated in the following by second acceptance flag.

Basically, if said $PV_{PC}$ is less or equal to said $PV_{VC}$, or if the difference between said $PV_{PC}$ and said $PV_{VC}$ does not exceed a determined threshold T2VC based on various business rules, then the Acceptance Module VC 8V delivers to the consolidator module VC 11V an OK second flag indicator. This OK second flag indicator indicates the acceptance of the $PV_{PC}$ by the validating carrier.

The E-ticket server system VC 1V receives from the consolidator module VC 11V and stores in the coupon database VC 3V the OK second flag indicator along with the accepted value $PV_{PC}$.

If said difference between said $PV_{PC}$ and said $PV_{VC}$ does exceed a given threshold, then the Acceptance Module VC 8V delivers to the consolidator module VC 11V a KO second flag indicator. This KO second flag indicator indicates the rejection of the $PV_{PC}$.

The E-ticket server VC 1V receives from the consolidator module VC 11V and stores the second flag indicator.

At steps 56 and 57 the second flag indicator is added to the settlement authorization code response message. Besides, in case the second flag indicator is a KO second flag indicator, the $PV_{VC}$ is added to the settlement authorization code response message.

The consolidator module VC (11V) also sends the second flag indicator and the coupon $PV_{VC}$ to the validating's Revenue Accounting VC (13V) thanks to the online link (12V).

At step 59, the E-ticket server system VC 1V sends a response to the settlement authorization code request message (refusal or settlement authorization) along with the second flag indicator and the $PV_{VC}$ if the second flag indicator is a KO flag indicator.

As the prorated value and flag indicator are conveyed along with a standard SAC response message, the number of communications between carriers is not increased and the invention does not make the current process significantly more complicated.

Figure 6:
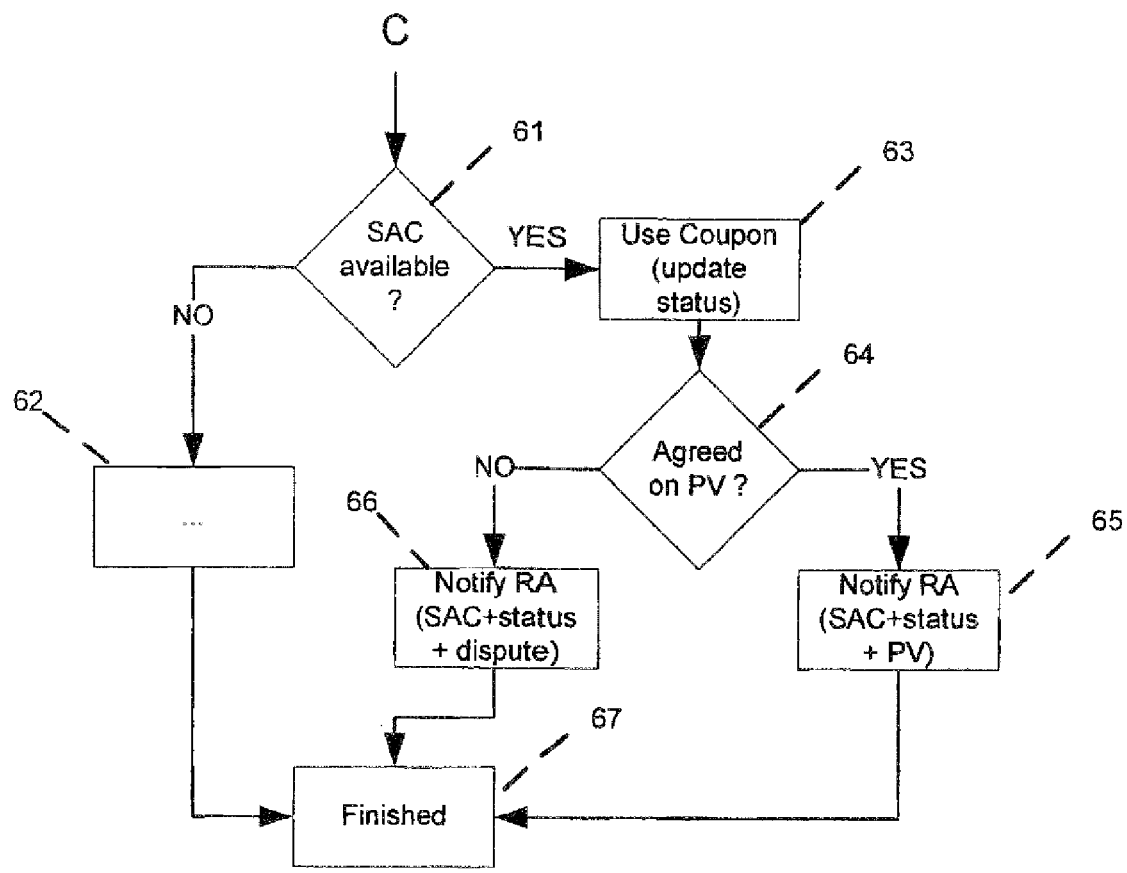
FIG. 6 is a flowchart of the process according to the invention performed at the participating carrier side upon reception of the settlement authorization code response message.

Referring now to FIG. 6 a flowchart of the process of the invention occurring on the participating carrier side upon reception of the settlement authorization code response message is illustrated.

The E-ticket server system PC 1P determines whether the validating carrier has delivered a settlement authorization code.

If no settlement authorization code is available then the participating carrier ends the process (step 62) the same way as it is done in prior art.

If the E-ticket server system PC (1P) receives the settlement authorization code in the response from the E-ticket server system VC 1V, it means that the validating carrier has delivered an authorization for future settlement. Therefore the coupon can be used (step 63), and its status can be updated.

Then, the E-ticket server system PC (1P) provides the consolidator module PC (11P) with the information sent by the validating carrier:
the settlement authorization code,
the second indicator flag
the $PV_{VC}$ in case the second flag indicator is a KO flag indicator.

The E-ticket server system PC 1P also transmits to the consolidator module PC 11P the $PV_{PC}$ as stored in the coupon database PC 3P as calculated by the proration module PC 6P at step 31.

In case the second flag indicator is KO, the consolidator module PC 11P calls the participating's Acceptance Module PC 8P and provides it with both $PV_{VC}$ and $PV_{PC}$ as sent along with the SAC response message.

This Acceptance Module VC 8V responds with an OK or KO third flag indicator, also designated in the following by third acceptance flag, and a prorated value (step 64).

If the difference between said $PV_{PC}$ and said $PV_{VC}$ as sent with the settlement authorization code response message does not exceed a determined threshold T3PC based on various business rules, then the Acceptance Module PC 13P delivers to the consolidator module PC 11P an OK third flag indicator. This OK third flag indicator indicates the acceptance of the $PV_{VC}$ by the participating carrier.

The SAC code with OK indicator and $PV_{VC}$ is sent to Revenue accounting 13P by consolidator module 11P.

If said difference between said $PV_{PC}$ and said $PV_{VC}$ does exceed the given threshold T3PC, then the Acceptance Module PC 8P delivers to the consolidator module PC 11P a KO third flag indicator. This KO third flag indicator indicates the rejection of the validating value. Therefore, the participating carrier will continue claiming its own value.

The consolidator module 11P sends back to the E-ticket server PC 1P, the OK/KO third flag indicator and the prorated value accepted or claimed by the participating carrier. It also sends the settlement authorization code, the third flag indicator and the coupon $PV_{PC}$ to the participating's Revenue Accounting PC 13P thanks to the online link 12P (steps 65 and 66).

The E-ticket server system PC 1P stores in its Coupon Database PC 3P this coupon value as accepted or as still claimed, along with the settlement authorization code delivered by the validating carrier.

Once the participating carrier has provided the transportation service, it will send an invoice to the validating carrier. The revenue accounting PC performs this process.

In the prior art, this invoice contains the coupon prorated value as calculated by the participating revenue accounting 13P and the associated settlement authorization code.

Significant improvements provided by the invention rely on the fact that the invoice also contains the third flag indicator. Therefore, the invoice reflects whether an agreement was reached thanks to the messages previously exchanged: the UAC message, the SAC request message and the SAC response message. If agreement is reached by E-ticket servers the invoice contains the value provided by consolidator module 11P.

When receiving from the participating carrier an invoice with an OK flag indicator, the validating carrier immediately knows that no additional checks are required and that the invoice can be settled.

At steps 28, 45, 59 information has been exchanged between the validating carrier and the participating carrier in order to find an agreement as early as possible. Therefore, the invention enables to exchange information at an early stage and to find an agreement most of the time before providing a service.

When receiving from the participating carrier an invoice with a KO flag indicator, the validating carrier immediately knows that no agreement has been reached so far and that a dispute process can be launched immediately. A correspondence may also be initiated directly by the participating carrier when generating the invoice.

Since both validating carrier and participating carrier already know that the acceptance attempts of steps 33, 55 and 64 failed, correspondence can be open without waiting any longer in order to reach an agreement.

The dispute process can start in parallel with invoice file exchange. The revenue accountings 13V, 13P of both carriers support a second new functionality in addition to the standard revenue accountings. Indeed, once a revenue accounting is notified by its E-ticket server system that the attempt to reach an agreement has failed, a dispute process can be initiated in parallel with invoice file exchange procedure.

Therefore, thanks to the invention the further dispute process is faster and more efficient than the current process wherein the correspondence begins only after three rejections notifications which may last for years.

Second Example

In the first above described example, the system of both VC and PC comprises a consolidator module 11V, 11P which is in charge of requesting the various other components and providing them with specific information. Such architecture presents the advantage of facilitating the understanding of the main features of the invention and may be modified.

Figure 7:
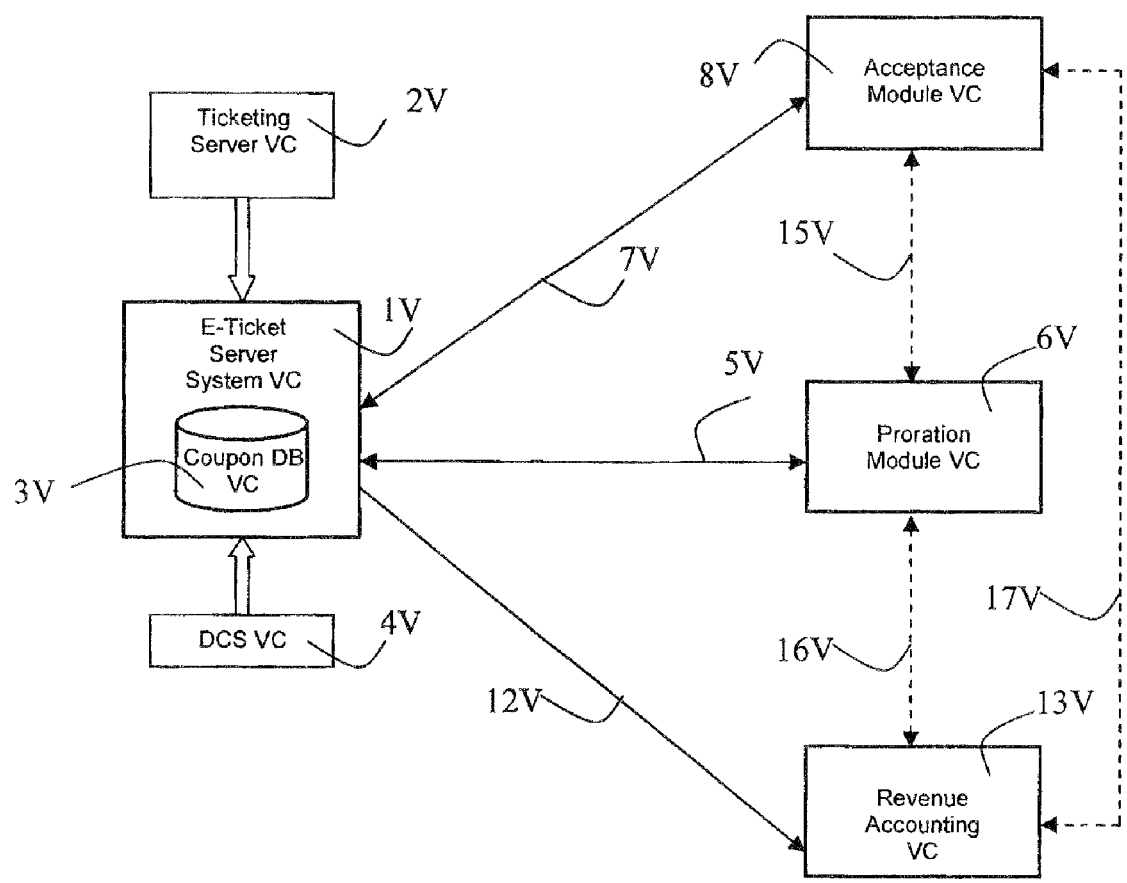
FIG. 7 is a schematic diagram of a portion of an agreement system according to another example of the present invention.

In a second example of the invention, the agreement system does not comprise standalone consolidator modules anymore. The remaining components are organized to incorporate the functions of the consolidator module. Thus, said remaining components can exchange information all together. Therefore, each carrier includes additional online and both-way links except for 12V. The validating carrier side according to this example is illustrated on FIG. 7. The E-ticket server system VC 1V, the proration module VC 6V, the acceptance module VC 8V and the revenue accounting VC 13V are connected together through the online connections 5V, 7V, 12V. Optional online connections 15V, 16V, 17V may also be in place, although they are not required for the invention to work. These non mandatory connections are represented in dashed lines in FIG. 7. The E-ticket server system VC 1V hosts the coupon database VC 3V and is connected to an ticketing server 2 and a DCS VC 4V.

Third Example

The current standard procedures imply that it is up to a participating airline to determine the prorated values of its own coupons. If the carriers choose to follow IATA standard procedure, the validating carrier has a possibility to skip the transmission of the prorated value upon UAC message or RAC response message emission.

Therefore, in regard with the first example above described, step 28 would not comprise a prorated value transmission. The first transmission of a prorated value would occur at step 45 on the participating carrier side. Thus, in this third example, the "first carrier" as mentioned in the above summary of the invention is the participating carrier.

In view of the above, it can be seen that the present invention presents a significant advancement in the interline revenue administration of carriers.

In particular, by moving the cycle of agreement on a coupon prorated value to a sales-based concept instead of a travel-based concept, the invention enables most of the time to reach an agreement before passenger travels. Therefore, the duration of settlement is significantly decreased for most E-tickets.

Proration is performed online and triggered by E-ticket processes, which makes available planned revenue value earlier for revenue accounting, enhancing therefore the efficiency of revenue accounting.

Whenever an agreement is reached during the invention process, it removes the need of further evaluating and checking incoming invoices. The invention therefore reduces time and removes time and money-consuming disputes.

Moreover, since it is fully automated, the invention does not increase administrative charges.

As the prorated values and flag indicators are conveyed along with the standard messages the number of communications between carriers is not increased and the process according to the invention is not significantly more complicated than the already existing processes.

Besides, the invention maintains carrier independence and freedom regarding proration algorithm, fare audit etc.

This invention has been described in considerable detail in order to provide those skilled in this field with the information needed to implement such agreement method. However, while particular embodiments of the present invention have been described herein in detail, it is to be understood that various alterations, modifications and substitutions can be made therein without departing in any way from the spirit and scope of the present invention, as defined in the following claims.

For example, certain steps of the described examples can be skipped or moved upstream or downstream in the process.

The consolidator module can be a stand alone module as described previously or can also be embedded in a revenue accounting module or in an E-ticket server system.

Furthermore, the whole invention can be easily adapted to suit ceaseless changing business practices. It will also be easy to tune the behavior of each module depending on many criteria such as validating carrier, participating carrier(s), channel, type of flights (domestic/international), point of sale, travel agency, origin, destination, ticket type, fare amount etc.

It will be understood from above that depending on the E-ticket at stake, an agreement system can either have a role of a validating carrier or a role of participating carrier.

What is claimed is:

1. An agreement method to consent to a prorated value of a coupon of an E-ticket, wherein the E-ticket corresponds to a transport service involving a validating carrier and at least one participating carrier expected to provide a transportation service on said coupon, the method comprising:

from issuance and before a usage of said coupon or from modification of the E-ticket and before the usage of said coupon,
generating or updating by an E-ticket server system related to the validating carrier the E-ticket and sending by the E-ticket server system related to the validating carrier to an E-ticket server system related to the participating carrier information regarding said E-ticket and said coupon, calculating by server system of a first carrier, taken among the validating carrier and the at least one participating carrier, through a proration module related to said first carrier, a prorated value $PV_1$ corresponding to said coupon based on predefined prorating rules and on said information regarding said E-ticket and said coupon, where the prorated value for a given coupon is a share of the E-ticket revenue that is attributed to the participating carrier providing the transportation service on said coupon, a remainder of the E-ticket revenue being distributed to the validating carrier and eventually to participating carriers different from the at least one participating carrier, sending by the server system of said first carrier to a second carrier server system said prorated value $PV_1$, the second carrier being taken among the validating carrier and the at least one participating carrier, and being different from the first carrier, and calculating by the server system of said second carrier, through a proration module related to said second carrier, a prorated value $PV_2$ corresponding to said coupon based on predefined prorating rules and on said information regarding said E-ticket and said coupon, wherein before usage of said coupon, launching an agreement process by any one of the server system of said first carrier and the server system of said second carrier regarding the prorated value corresponding to said coupon, wherein if no agreement is reached through the agreement process then launching by any one of the server system of said first carrier and the server system of said second carrier a dispute process between the validating carrier and the participating carrier, and wherein if an agreement is reached through the agreement process then allowing distribution of the prorated value to the participating carrier and distributing the remainder of the E-ticket revenue to the validating carrier and eventually to other participating carriers different from the at least one participating carrier.

2. The method of claim 1 wherein the prorated value $PV_1$ is sent in real time from issuance or from modification of the E-ticket.

3. The method of claim 1 wherein the prorated value $PV_1$ is sent along with an industry-standard message.

4. The method of claim 1 wherein once available at the E-ticket server system of a given carrier, said information is provided in real time to the proration module of said given carrier.

5. The method of claim 4 wherein once calculated by the proration module of a given carrier, the prorated value is provided in real time to the E-ticket server system of said given carrier.

6. The method of claim 1 wherein an acceptance module related to said second carrier calculates the difference between said $PV_1$ and said $PV_2$, and determines from said difference and from a given threshold T1SC whether it accepts the prorated value $PV_1$.

7. The method of claim 6 wherein the threshold T1SC is based on at least one of the information regarding said E-ticket and coupon or depends on business rules of the second carrier.

8. The method of claim 6 wherein the second carrier indicates to the first carrier whether it accepts the $PV_1$ by sending to the first carrier a first flag indicator, the first flag indicator being an acceptance flag indicator (OK flag indicator) in case the second carrier accepts the $PV_1$ or being a rejection flag indicator (KO flag indicator) in case the second carrier does not accept the $PV_1$.

9. The method of claim 8 wherein the second carrier sends in real-time to the first carrier at least one of the first flag indicator or the prorated value $PV_2$ in case the first flag indicator is a rejection flag.

10. The method of claim 8 wherein the second carrier sends to the first carrier along with an industry-standard message at least one of the first flag indicator or the prorated value $PV_2$ in case the first flag indicator is a rejection flag.

11. The method of claim 8 wherein in case the first flag indicator is an acceptance flag, then a revenue accounting module related to the first carrier or a revenue accounting module related to the second carrier are informed that an agreement has been reached regarding said coupon.

12. The method of claim 8 wherein in case the first flag indicator is an acceptance flag, then the prorated value $PV_1$ for which an agreement has been reached is sent to the revenue accounting modules of each carrier.

13. The method of claim 8 wherein in case the first flag indicator is a rejection flag, the first carrier receives the prorated value $PV_2$ and after an possible recalculation of the prorated value $PV_1$, calculates the difference between said $PV_1$ and said $PV_2$, and determines from said difference and from a given threshold T2FC whether it accepts the prorated value $PV_2$.

14. The method of claim 13 wherein the first carrier indicates to the second carrier whether it accepts the $PV_2$ by sending to the second carrier a second flag indicator, the second flag indicator being an acceptance flag indicator (OK flag indicator) in case the first carrier accepts the $PV_2$ or being a rejection flag indicator (KO flag indicator) in case the first carrier does not accept the $PV_2$.

15. The method of claim 14 wherein the first carrier sends by one of in real-time or along with an industry-standard message to the second carrier the second flag indicator or the prorated value $PV_1$ in case the second flag indicator is a rejection flag.

16. The method of claim 14 wherein in case the second flag indicator is a rejection flag, the second carrier receives the prorated value $PV_1$ and after an possible recalculation of the prorated value $PV_2$, calculates the difference between said $PV_1$ and said $PV_2$, and determines from said difference and from a given threshold T3SC whether it accepts the prorated value $PV_1$.

17. The method of claim 16 wherein the second carrier indicates to the first carrier whether it accepts the $PV_1$ by sending to the first carrier a third flag indicator, the third flag indicator being an acceptance flag indicator (OK flag indicator) in case the second carrier accepts the $PV_1$ or being a rejection flag indicator (KO flag indicator) in case the second carrier does not accept the $PV_1$.

18. The method of claim 16 wherein the second carrier sends by one of in real-time or along with an industry-standard message to the first carrier the third flag indicator or the prorated value $PV_2$ in case the third flag indicator is a rejection flag.

19. The method of claim 17 wherein the participating carrier generates an invoice corresponding to the prorated value of said coupon and at least one of stores the invoice or sends the invoice with the third flag indicator.

20. The method of claim 17 wherein in case the third flag indicator is a rejection flag, then performing at least one of the revenue accounting of each carrier are informed that no agreement has been reached regarding said coupon or the first or the second carrier launches a dispute process.

21. An agreement system to consent to a prorated value of a coupon of an E-ticket, wherein the E-ticket corresponds to a transport service involving a validating carrier and at least one participating carrier expected to provide the transportation service on said coupon, the system comprising:
- an E-ticket server system and a proration module related to the validating carrier,
- an E-ticket server system and a proration module related to the at least one participating carrier,
- wherein the E-ticket server system related to the validating carrier and the E-ticket server system related to the at least one participating carrier being configured to contain, send and receive information regarding said E-ticket and said coupon,
- wherein the proration module related to the validating carrier and the proration module related to the at least one participating carrier being configured to calculate a prorated value PV corresponding to said coupon based on predefined prorating rules and said information, where the prorated value for a given coupon being the share of the E-ticket revenue that is attributed to the participating carrier providing the transportation service on said coupon, the remainder of the E-ticket revenue being distributed to the validating carrier and eventually to other participating carriers that are different from the at least one participating carrier,
- wherein the E-ticket server system related to the validating carrier is configured to send said information, from issuance or modification of the E-ticket and before usage of said coupon, to the E-ticket server system related to the at least one participating carrier,
- wherein the server systems are configured to calculate and to send from a first carrier, from issuance and before usage of said coupon or from modification of the E-ticket and before usage of said coupon, a prorated value $PV_1$ to a second carrier, wherein said first carrier and said second carrier being taken among the validating carrier and the at least one participating carrier and wherein the second carrier is different from the first carrier,
- wherein the server system of said second carrier is configured to, upon reception of said information and of a prorated value $PV_1$, calculate in real time through its proration module its own prorated value $PV_2$ and compare the calculated prorated value $PV_2$ to the prorated value $PV_1$ received from the first carrier,
- wherein the server systems are further configured to, before usage of said coupon, launch an agreement process regarding the prorated value corresponding to the coupon,
- wherein the server systems are further configured to, if no agreement is reached through the agreement process, launch a dispute process between the validating carrier and the at least one participating carrier, and
- wherein the server systems are further configured to, if an agreement is reached through the agreement process, allow distributing the prorated value to the participating carrier and distributing the remainder of the E-ticket revenue to the validating carrier and eventually to other participating carriers that are different from the at least one participating carrier.

22. The agreement system of claim 21 further comprising online links arranged so that the prorated value $PV_1$ is sent in real time from issuance or from modification of the E-ticket.

23. The agreement system of claim 22 where each carrier indicates to the other carrier whether it accepts or it rejects the prorated value as calculated by the other carrier by sending to said other carrier a flag indicator.

24. The agreement system of claim 23 where the prorated values or the flag indicator are sent along with industry-standard messages or in real time.

25. The agreement system of claim 24, where the industry standard messages comprise at least one of an "Unsolicited Airport Control message" (UAC), a Request Airport Control message (RAC) or a Settlement Authorization Code Request message (SAC).

* * * * *